United States Patent [19]

Brighton

[11] Patent Number: 4,504,294
[45] Date of Patent: Mar. 12, 1985

[54] EXHAUST PROCESSOR ASSEMBLY

[75] Inventor: John C. Brighton, Columbus, Ind.

[73] Assignee: Arvin Industries, Inc., Columbus, Ind.

[21] Appl. No.: 511,856

[22] Filed: Jul. 8, 1983

[51] Int. Cl.³ .................... B01D 46/00; B01D 39/20; F01N 3/02
[52] U.S. Cl. ...................... 55/502; 55/523; 55/DIG. 30; 60/311; 422/179; 422/180
[58] Field of Search ............... 55/502, 523, DIG. 10, 55/DIG. 30; 210/510.1; 422/179, 180; 428/116–118; 60/311

[56] References Cited

U.S. PATENT DOCUMENTS

| | | | |
|---|---|---|---|
| 4,087,039 | 5/1978 | Balluff | 228/173 R |
| 4,142,864 | 3/1979 | Rosynsky et al. | 422/180 |
| 4,143,117 | 3/1979 | Gaysert | 422/179 |
| 4,209,494 | 6/1980 | Oya et al. | 422/180 |
| 4,269,807 | 5/1981 | Bailey et al. | 422/179 |
| 4,285,909 | 8/1981 | Mizusawa et al. | 422/179 |
| 4,328,187 | 5/1982 | Musall et al. | 422/179 |
| 4,344,922 | 8/1982 | Santiago et al. | 422/179 |
| 4,353,872 | 10/1982 | Midorikawa | 422/179 |
| 4,386,497 | 6/1983 | Takagi et al. | 60/296 |
| 4,397,817 | 8/1983 | Otani et al. | 422/179 |
| 4,404,798 | 9/1983 | Takagi et al. | 60/296 |
| 4,419,108 | 12/1983 | Frost et al. | 55/502 |

FOREIGN PATENT DOCUMENTS

| | | | |
|---|---|---|---|
| 2000162 | 8/1969 | France | 55/502 |
| 18756 | 2/1974 | Japan | 422/179 |
| 129214 | 8/1982 | Japan | 55/DIG. 30 |
| 179062 | 11/1982 | Japan | 55/523 |

Primary Examiner—David L. Lacey
Attorney, Agent, or Firm—Barnes & Thornburg

[57] ABSTRACT

An exhaust processor having a housing and a diesel particulate trap or filter retained within the housing is provided with a particulate trap seal. The housing includes an inlet for introducing a combustion product into the housing and an outlet for exhausting combustion product from the housing. The trap includes a monolithic cellular structure having two opposing ends. The structure includes a plurality of intermediate walls arranged to provide a plurality of substantially parallel passages. The intermediate walls and passages extend longitudinally from the housing inlet to the housing outlet. The exhaust processor further includes plugs for closing alternate passages at opposite ends of the particulate trap. Additionally, the exhaust processor includes a seal on the peripheral edge at each end of the outer wall of the particulate trap to block the passage of combustion product through the passages adjacent to the outer wall. Each seal can include a side wall portion embracing the outer wall of the cellular structure and a lip portion overlying a radially outer portion of one end of the cellular structure.

6 Claims, 15 Drawing Figures

EXHAUST PROCESSOR ASSEMBLY

This invention relates exhaust processors, and particularly to diesel particulate filters and particulate traps to prevent exhaustion of unfiltered exhaust gases. The invention may have application to catalytic reactor processors, including potentially a catalyzed diesel filter or trap.

Conventional catalytic converters include a housing shell in communication with the exhaust manifold of an internal combustion engine and a monolithic substrate disposed therein to filter out noxious pollutants from the engine exhaust gases. The substrate is generally formed by extruding an extremely brittle refractory material. Typically, such a substrate includes a plurality of passages extending completely axially therethrough to expose engine exhaust gases to a catalyst on the walls of such passages.

In presently proposed traps, opposite ends of alternate passages of the substrate are closed to filter particulate matter by guiding the exhaust gases through the porous walls of adjacent passages. Examples of such particulate traps are to be found in U.S. Pat. Nos. 4,276,071 and 4,329,162. This extrusion is susceptible to serious damage during handling, assembly, and use.

Two principal causes of incomplete filtration of environmentally damaging pollutants in diesel partiuclate filters are fracture of the fragile substrate during handling and failure of certain plugs in the alternate passages of the substrate. Voids or chips in the peripheral surface of the substrate provide an undesirable means for venting unfiltered exhaust gases into the atmosphere. Microscopic fissures first acquired during manufacture can mature into exhaust gas venting voids in the peripheral skin of the fragile substrate over time. Voids and chips frequently develop on the substrate periphery adjacent the ends as well as along the longitudinal outer surface or skin.

In addition, alternate plugs in the particulate trap passages tend to deteriorate and fall out, thereby providing a direct unfiltered passage through the substrate. Plug failure is most common near the outer surface of the generally cylindrical substrate. Many passages adjacent the substrate skin are characterized by an abbreviated cross-sectional area due to the geometry of the outer surface. Accordingly, plugs that are smaller than conventional "full-sized" plugs are used to close these reduced size passages. However, these smaller plugs frequently decay, providing a number of unwanted particulate filter bypass passages. Satisfactory manufacturing processes and materials are not presently available to prevent substrate surface voids. Therefore, the presence of substrate defects and the frequency of plug failures continue to seriously frustrate pollution control of automobile and truck exhaust gases.

Limited-use peripheral substrate seals are disclosed in U.S. Pat. Nos. 3,915,658 (Scheitlin et al) and 3,978,567 (Vroman). In Scheitlin, a catalytic converter includes an open-ended continuous casing adapted to receive a substrate containing a catalyst. The substrate or filter is retained in a fixed axial position within the casing by an annular flange at one end and an inwardly extending collar mounted to the opposite end of the casing. A mesh sleeve is provided intermediate the substrate and the housing to cushionably support the outer surface of the substrate. Although the annular flange and the collar provide satisfactory seats to hold the substrate, they do not effect a seal-like barrier to the flow of exhaust gases. Typically, this failure is due to peripheral end defects in the substrate. Similarly, the mesh construction of the peripheral substrate support does not provide an effective outer surface seal. Further, any sealing effect generated by the substrate support of Scheitlin would only be applicable to catalytic converters employing the so-called "stuffed-can" design disclosed in the Scheitlin reference.

Similarly, in Vroman, the catalytic converter does not have a sealing means that is able to compensate for peripheral end defects in the substrate and alternate passage plug failures. Vroman discloses a substrate or filter supported within a housing by a pair of wire mesh "ropes" that extend around the substrate in closed loops transverse to the axial gas flow through the reactor. The ropes are confined within a corresponding pair of axially spaced grooves in the outer surface of the substrate. Although the wire mesh ropes may hinder exhaust gas flow through the longitudinal space between the housing and substrate, Vroman does not disclose a sealing means for protecting against filtration failure due to plug failures in alternate passages situated near the periphery of the substrate. Without this type of protection, Vroman would allow particulate matter to escape through the ends and pass through the substrate without filtration.

The present invention provides a means for sealing the peripheral edge of the outer wall of the substrate. The seal of the present invention is formed of a material impervious to the flow of exhaust gases. The peripheral seal blocks passage of particulate matter through the longitudinal passages of reduced cross-sectional area adjacent to the outer surface of the substrate. The instant seal also blocks exhaust gas flow through the space between the outer surface of the substrate and the inner surface of the substrate housing.

In accordance with the present invention, an exhaust processor includes a housing and a particulate trap or filter retained within the housing. The exhaust processor further includes an inlet for introducing a combustion product from an internal combustion engine into the housing and an outlet for exhausting filtered combustion product from the housing. The particulate trap includes a cellular structure or substrate having two opposing ends or faces. The structure includes a plurality of intermediate walls to provide a plurality of substantially parallel passages. The intermediate walls and passages extend longitudinally from the housing inlet to the housing outlet. Additionally, the exhaust processor includes means for closing alternate passages at opposite ends of the particulate trap. As a result of the closing means, any exhaust gases that enter a passage at the inlet end must pass through the intermediate wall to an adjacent passage in order to exit at the outlet end.

The exhaust processor filter further includes a seal on the peripheral edge at each end of the outer wall of the particulate trap to block the passage of combustion product through the passages adjacent to the outer wall. Each seal can include a side wall portion embracing the outer wall of the cellular structure, and a lip portion overlying a radially outer portion of one end of the cellular structure. Additionally, the side wall portion of the seal can be captured between the outer wall of the cellular structure and an inner surface of the housing. The side wall portion can be radially compressed therebetween. The side wall and lip portion can be a heat-expandable mat mount material.

According to one preferred embodiment of the invention, the lip portion is captured between the peripheral edge of the outer wall of the cellular structure and an inner surface of the housing that has been radially inwardly canted. The lip portion can be radially and axially compressed therebetween. The seal of this embodiment is adaptable to an exhaust processor of the "clam-shell" type.

According to another embodiment of the present invention, the housing comprises a plurality of radially inwardly projecting flanges. These flanges embrace the ends of the cellular structure to axially fix the structure. The lip portion can be captured between the peripheral edge of the outer wall of the cellular structure and a radially inwardly facing surface of the flange. The lip portion can be axially compressed therebetween. The seal of this embodiment is adaptable to an exhaust processor generally resembling the "stuffed-can" type.

In this specification and in the claims, the words "an exhaust processor" are intended to refer to the various types of diesel particulate filters, particulate traps, and catalytic processors in connection with which the invention may be used.

The invention can best be understood by referring to the following description and accompanying drawings which illustrate preferred embodiments exemplifying the best mode of carrying out the invention as presently perceived. In the drawings.

Figure 1:
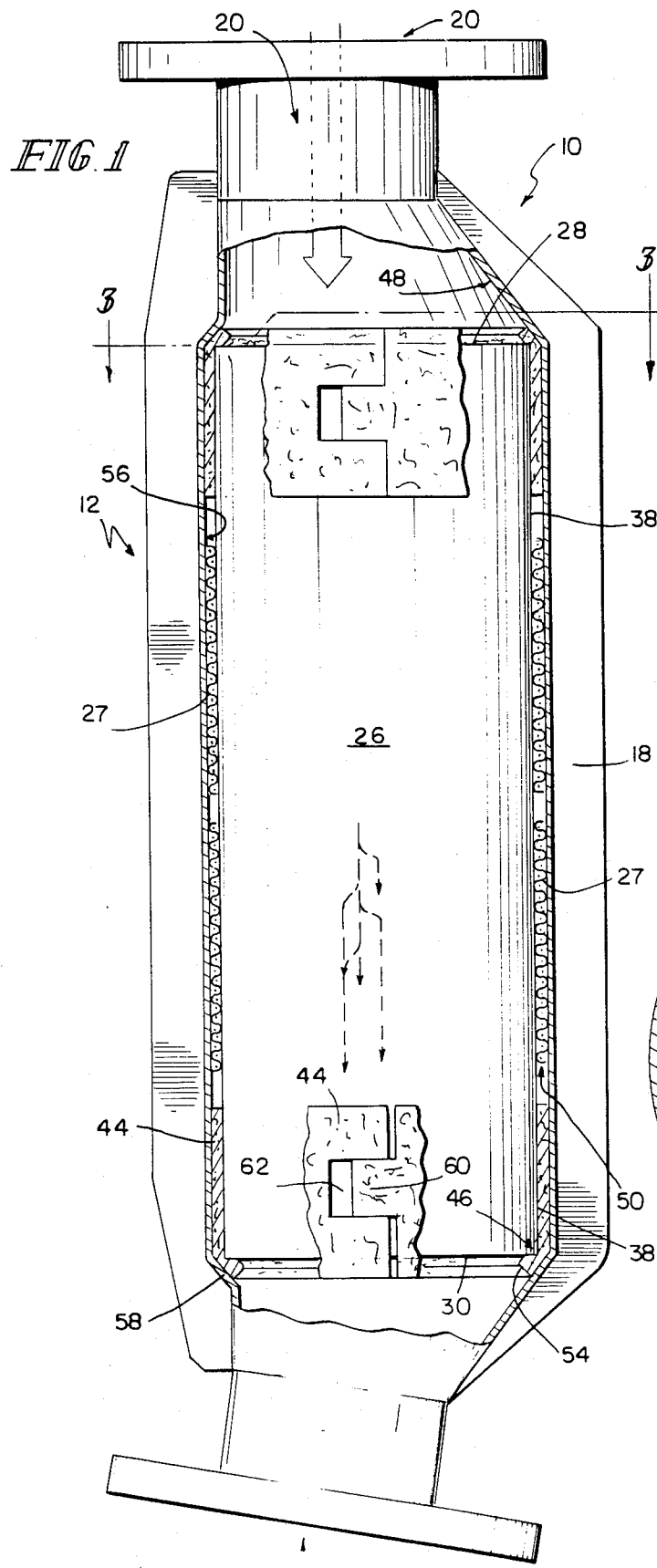
FIG. 1 is a top plan view of a "clam-shell" type diesel particulate filter incorporating one of the preferred embodiments of the seal of the present invention with portions broken away.
Figure 2:
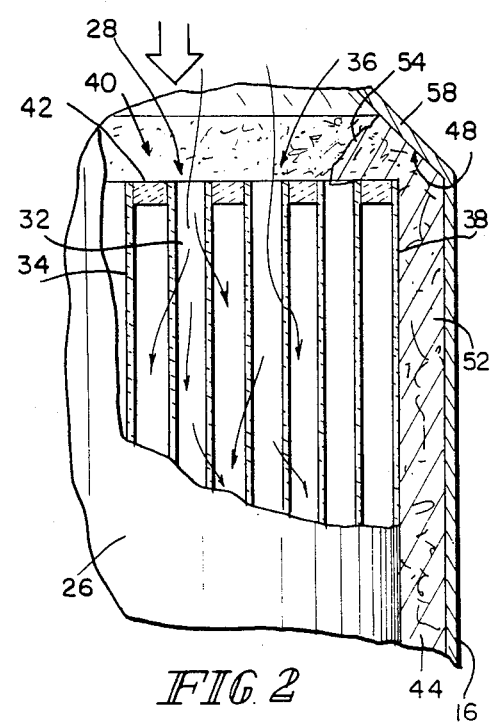
FIG. 2 is an enlarged detail view of the embodiment shown in FIG. 1 partially broken away.
Figure 3:
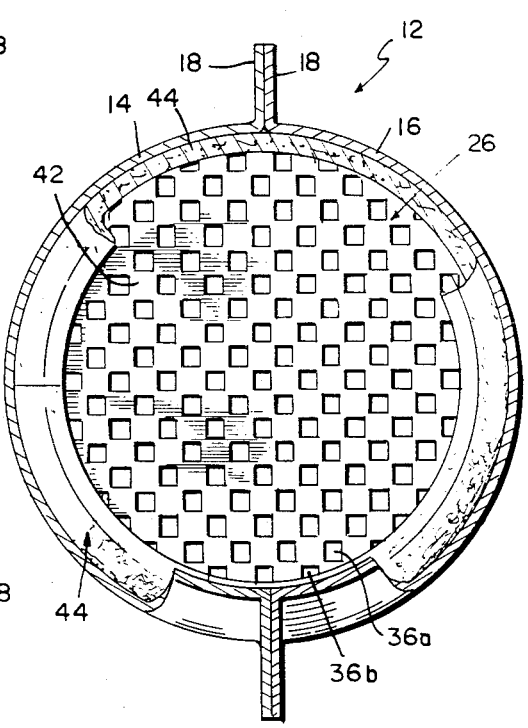
FIG. 3 is a view of a transverse cross section of the embodiment shown in FIG. 1, taken along line 3—3 of FIG. 1.

In the embodiment of FIGS. 1, 2, and 3, an exhaust processor 10 comprises a housing 12 of the clam-shell type including an upper half shell 14 and a lower half shell 16. Shell halves 14, 16 are conventionally steel stampings. In final assembly, halves 14, 16 are welded or otherwise joined along shell flanges 18.

The housing 12 further includes a housing inlet 20 to receive a combustion product of an internal combustion engine (not shown) into the cavity 22 formed by the marriage of the upper and lower half shells 14, 16. Also, a housing outlet 24 is provided to exhaust combustion product from the housing.

A particulate trap or filter 26 is disposed within cavity 22 of the housing 12. The substantially cylindrical trap 26 is a monolithic cellular structure. The trap 26 is partially supported within the cavity 22 by wire mesh supports 27. The trap 26 includes a pair of transversely extending faces or ends 28, 30. Upstream end 28 of the housed trap lies adjacent to the housing inlet 20 and the downstream end 30 lies adjacent to the housing outlet 24. A large number of thin-walled parallel passages 32 extend radially and longitudinally between the trap ends 28, 30.

Each passage 32 is hollow and bounded by passage openings 36. Most of the radially inner passage openings 36 have a uniform cross-sectional area and a generally square shape (e.g., at 36a). However, radially outer passage openings 36, adjacent to the outer surface or skin 38 of the trap 26, are characterized by reduced cross-sectional area and non-uniform shape (e.g., at 36b). The abbreviated openings 36b result from longitudinal disposition of a plurality of square-shaped passages 32 within a generally cylindrical housing 12 as best shown in FIG. 3.

Disposed within certain passage openings 36 are means 40 for closing alternate passages 32 at opposite ends of the trap 26. Means 40 include a plug 42 made to conform to the passage opening 36 to be blocked. Each longitudinal passage 32 has one of its two passage openings 36 plugged to promote filtration of particulate matter by forcing exhaust gas to flow through the semipermeable thin walls 34 of the passages 32. Accordingly, a "checker board" lattice of passage openings 36 in the upstream end 28 of the trap 26 are plugged. Each plugged passage is adjacent only to unplugged passages as shown in FIG. 2. Also, the passage openings 36 in the downstream end 30 of the trap 26 are plugged to complement the unplugged openings of the upstream end 28. Therefore, any exhaust gas or combustion product that enters the trap 26 through an unplugged opening in the upstream end 28 must pass through the semipermeable thin walls 34 in order to exit the trap 26 at the downstream end 30. Particulate matter unable to percolate through the passage walls 34 is thereby filtered to prevent emission of noxious material to the atmosphere.

The exhaust processor 10 further includes a seal 44 embracing the peripheral edge 46 of the outer wall 38 at each of the trap ends 28, 30. The seal is situated intermediate the outer wall 38 of the trap and a contoured inner surface 48 of the housing 12 to block passage of particulate matter through the space 50 between the trap 26 and the housing 12 as shown in FIG. 1.

The seal 44 includes a thin sheet of resilient material of a length sufficient to enshroud the circumference of the outer wall 38 of a housed trap 26. However, the thin seal 44 has a thickness sufficient to sealably occupy the space 50 between the trap 26 and the housing 12 when wrapped around an axially outer end of the outer wall 38. Accordingly, the resilient material of the seal 44 is deformable to follow the contoured inner housing surface 48 when pressed around the peripheral edge 46 of the trap 26 during closure of the shell halves 14, 16. Desirably, the resilient material is a heat-expandable mat mount material. For example, Interam ® mat manufactured by Technical Ceramic Resource Dept./3M Center, St. Paul, Minn. is sufficient.

The seal 44 further includes a side wall portion 52 and a lip portion 54. The side wall portion 52 is captured between an axially outer end of the outer wall 38 of a housed trap 26 and a longitudinal portion 56 of the contoured inner housing surface 48. The captured side wall portion 52 is radially compressed. The lip portion 54 is captured between the peripheral edge 46 of one of the trap ends 28, 30 and a radially inwardly canted portion 58 of the contoured inner housing surface 48 as shown in FIGS. 1 and 2. The captured lip portion is radially and axially compressed.

Desirably, the seal 44 further includes a tongue 60 projecting from a central portion of one end of the seal 44 and a tongue-receiving slot 62 in a complementary portion of the other end of the seal 44. The tongue 60 engages the tongue-receiving slot 62 to flushly join the ends of the wrapped seal 44, thereby providing a longitudinal barrier to the flow of combustion product through the space 50. A precise fit is not required since the tongue 60 sufficiently obstructs the combustion product flow by denying a straight-line path across the width of the wrapped seal 44.

Installation of a seal 44 is effected by wrapping the seal 44 around an axially outer end of the outer wall 38 so that the ends of the seal are suitably joined. The lip portion 54 of the seal 44 is allowed to extend axially outwardly at least a predetermined distance beyond one of the trap ends 28, 30. A conventional vibration-insulating wire cloth can be wrapped around the trap 26 to lie in the space 50 intermediate the two wrapped seals 44 as shown in FIG. 1. Finally, the seal-bearig trap 26 is placed within the housing cavity 22 of shell halves 14, 16, thereby deforming the lip portion 54 of each seal to partially cover each of trap ends 28, 30. As a result, the lip portion 54 overlies a peripheral portion of the end of the particulate trap 26 to block the passage of particulate matter through certain of the plugged and unplugged passages 32 as shown in FIGS. 2 and 3. Therefore, exhaustion of unfiltered combustion product due to plug failure is prevented since the lip portion 54 of seal 44 seals all of the failure-prone radially outer passages 32.

Figure 4:
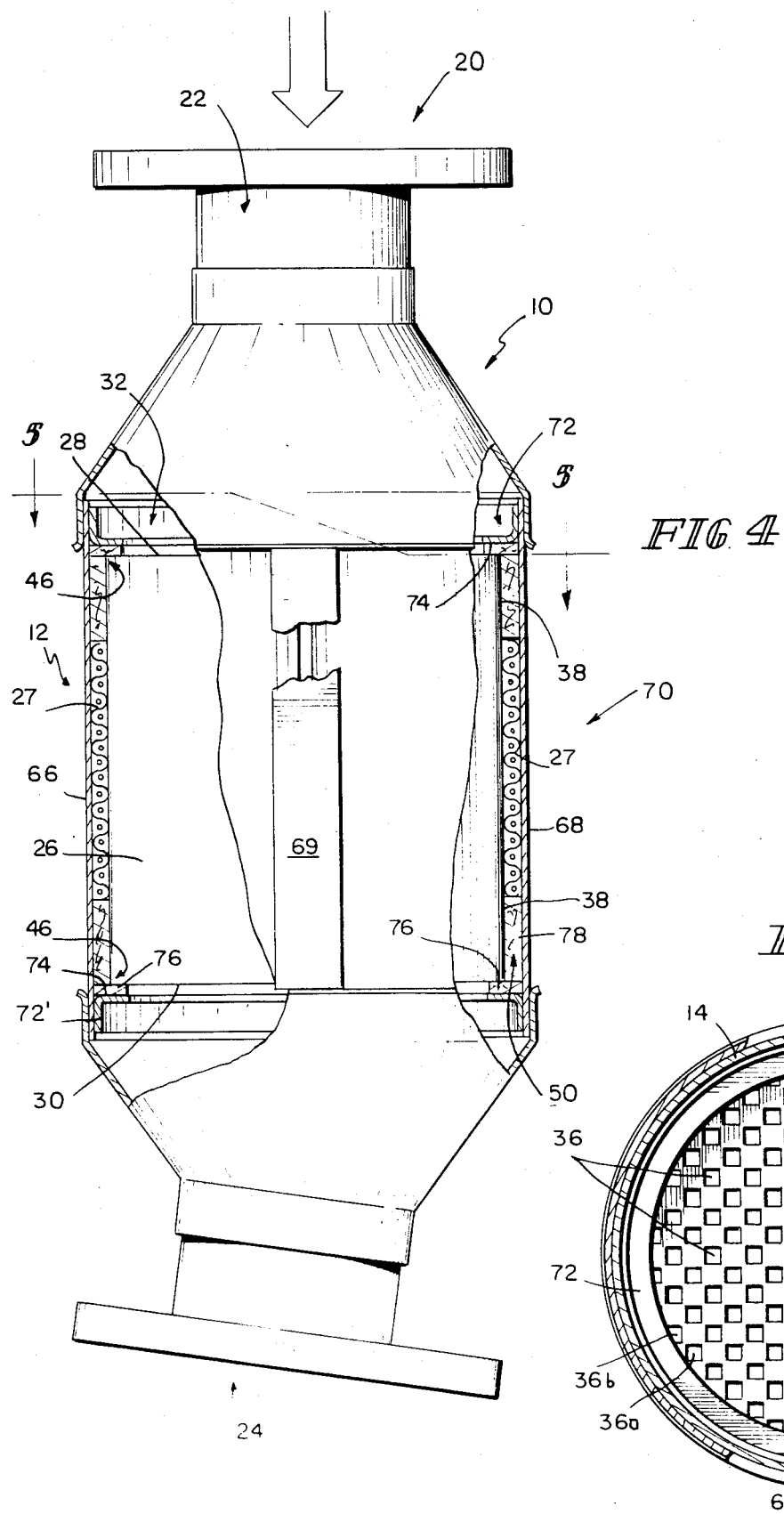
FIG. 4 is a top plan view of a "stuffed-can" type diesel particulate filter incorporating the other of the preferred embodiments of the seal of the present invention with portions broken away.
Figure 5:
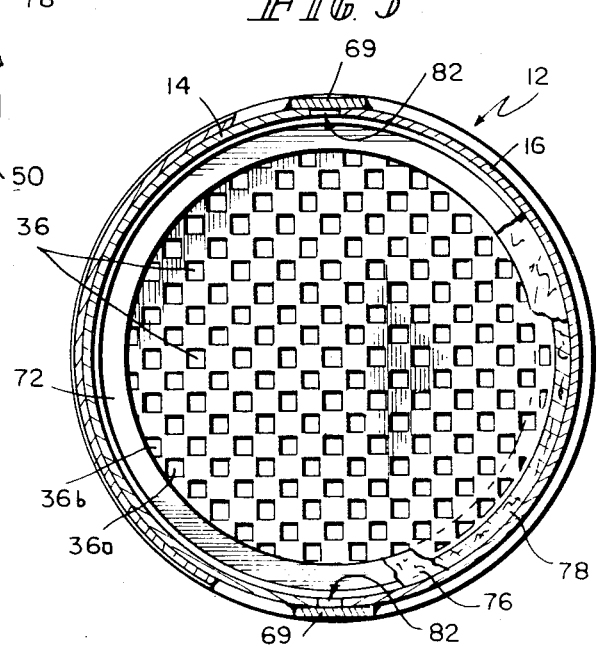
FIG. 5 is a view of a transverse cross section of the diesel particulate filter showing the alternately plugged and unplugged passages in the cellular structure taken along lines 5—5 of FIG. 4.
Figure 6:
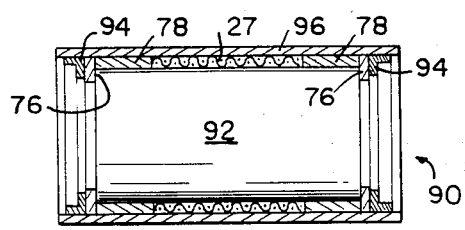
FIGS. 6–15 are schematic views of some other alternative embodiments of the invention.
Figure 11:
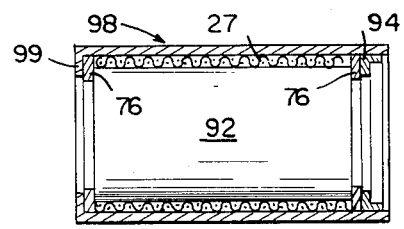
Figure 7:
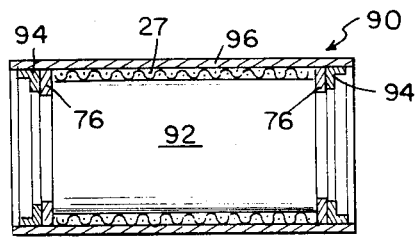
Figure 12:
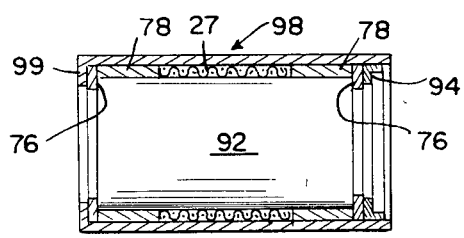
Figure 8:
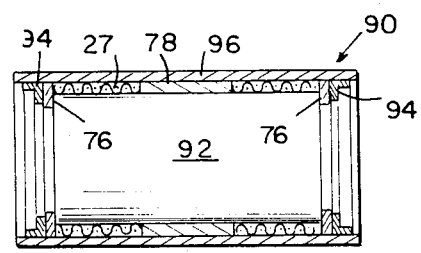
Figure 13:
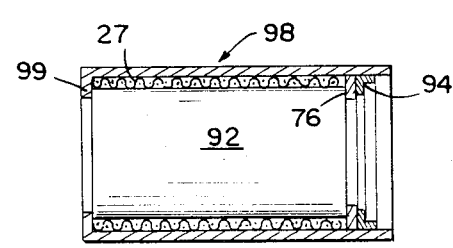
Figure 9:
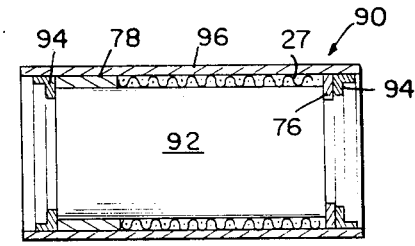
Figure 14:
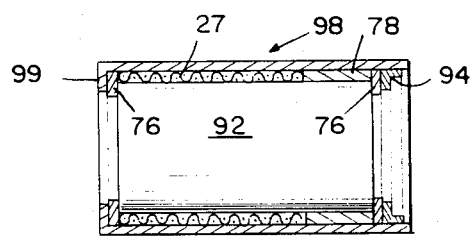

In the embodiment of the invention illustrated in FIGS. 4 and 5, those elements numbered identically with the embodiment of FIGS. 1, 2, and 3 perform the same or similar functions. In the embodiment of FIGS. 4 and 5, the housing 12 comprises a pair of thin-walled cylinder halfs 66, 68, commonly called shells, joined by a pair of longitudinal straps 69 to form a generally right open-ended cylinder 70, which can be of round or elliptical transverse section.

A radially inwardly extending annular flange 72 is mounted to a radially inner surface of each of the cylinder halfs 66, 68 near the upstream end of each skin as shown in FIG. 4. Each flange 72 includes an axially inwardly facing surface 74 to provide an annular seat to longitudinally position a particulate trap 26. An annular sealing ring 76 is interposed between the seat 74 and the adjacent trap end 28, 30 to seal certain of the plugged and unplugged passages 32 as shown in FIG. 5. Therefore, the annular sealing ring 76 of the instant embodiment performs a function similar to that of the seal lip portion 54 of the embodiment disclosed in FIGS. 1-3.

A sealing band 78 is wrapped around an axially outer end of the trap 26 to abut the axially inner surface of the captured annular sealing ring 76. The band 78 may be elastically continuous or joinable end-to-end via a tongue and slot as noted above, or joined in such a manner as to prevent axial flow. The sealing band 78 of the instant embodiment occupies the space 50 between the inner surface of cylinder halfs 66, 68 and the outer wall 38 of the trap 26 to perform a function similar to that of the side wall portion 44 of the embodiment disclosed in FIGS. 1-3.

During assembly, the seal-bearing particulate trap 26 is held against annular flange 72 with substantial preload, e.g., 85 lbs., while the other annular flange 72' is attached, e.g., by welding, to the inner surface of the cylinder halfs shells 66, 68 near the downstream end as shown in FIG. 4. Such pre-loading assures the position of the particulate trap 26 within the housing 12 formed by the two cylinder halfs 66, 68. The trap 26 is partially supported within the housing 12 by wire mesh supports 27. As shown in FIG. 5, a pair of longitudinal channels 82 are formed on either side of the particulate trap 26 at the junction of the cylinder halfs 66, 68 with the longitudinal straps 69. The ends of the longitudinal channels 82 are sealed by seal 78.

Both seals are desirably formed of a heat-expandable mat mount material of the type disclosed in the embodiment of FIGS. 1-3. In the embodiment of FIGS. 4 and 5, the axially compressed sealing ring 76 seals all of the radially outer failure-prone passage openings 36 to prevent exhaustion of unfiltered combustion product due to plug failure. The radially compresed sealing band 78 and the ring 76 cooperate to ensure that particulates cannot bypass the particulate trap by passing through voids in the outer wall 38 and escaping to the atmosphere via the peripheral space 50 between the housing 12 and the particulate trap 26.

Other techniques, of course, may be used to form the housing or shell about the substrate. For instance, the substrate may be stuffed into a cylindrical shell or the cylindrical shell could be axially split and drawn together, or loaded against the mat and welded.

A variety of possible combinations is shown in FIGS. 6-15. The combinations are merely illustrative and not exhaustive of all possibilities within the scope of the invention.

FIGS. 6-9 schematically illustrate an axially split cylinder form of an exhaust processor in accordance with the present invention. Each processor 90 includes a monolithic cellular structure or filter 92 positioned between two flanges 94 extending inwardly from the cylinder wall 96. At least one sealing band 78 is circumferentially positioned in the space between the cylinder wall 96 and the filter 92. The filter 92 is usually supported in part by wire mesh support 27. The wire mesh support can be omitted in situations such as that shown in FIG. 6 where sealing bands 78 provide adequate support for the monolithic structure 92. At least one annular sealing ring 76 is provided between an end flange 94 and an end of the filter 92. During the assembly, the structures are preloaded to the extent necessary to ensure a seal preventing exhaust flowing into the processor 90 from by-passing the filter 92.

Figure 10:
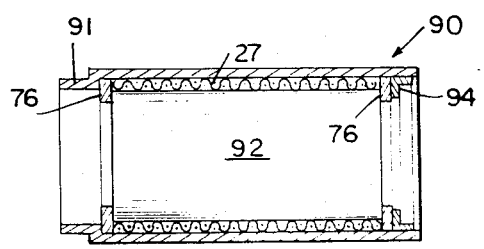
Figure 15:
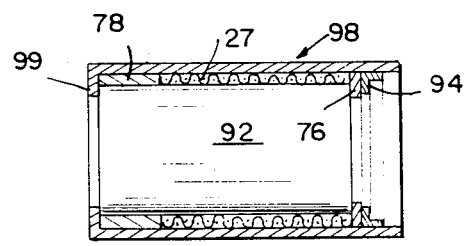

FIG. 10 schematically illustrates a clam shell-type exhaust processor 90 including a necked-down end portion 91 integral to one of the ends of the processor 90 and a flange 94 at the other of the processor ends. The filter 92 is received therein with a pair of annular sealing rings 76, and supported by a wire mesh support layer 27.

FIGS. 11-15 schematically illustrate a cylindrical shell 98 having an inwardly turned end 99 which is axially stuffed with a filter 92 which is thereafter secured in place by ring flange 94. The filter 92 is supported by a wire mesh support layer 27 and sealed by a sealing band 78 and/or an annular sealing ring 76.

In each of the structures shown in FIGS. 6-15, the sealing band 78 and/or sealing rings 76 act to prevent exhaust products from by-passing the filter 92 contained within the processor 90. The sealing ring 76 and sealing band 78 can also be unitary as shown in FIGS. 1-3 so as to include both a side wall portion and a lip portion. Generally, the sealing band 78 is compressed radially while the annular sealing ring 76 is compressed axially. The material preferably employed to form the sealing elements 76 and 78 is a heat-expandable mat-mounting material as previously disclosed.

Although the invention has been described in detail with reference to certain preferred embodiments and specific examples, variations and modifications exist within the scope and spirit of the invention as described and as defined in the following claims.

What is claimed is:

1. An exhaust processor assembly comprising a housing, the housing including an inlet for introducing a combustion product into the housing and an outlet for exhausting combustion product from the housing, a particulate trap in the housing, the trap comprising a cellular structure having opposite ends, an outer wall extending longitudinally between said ends, and a plurality of permeable intermediate walls to provide a plurality of substantially parallel passages extending longitudinally therethrough from said inlet to said outlet, means for closing alternate passages at opposite ends of the trap such that combustion product entering a passage at the inlet end must pass through an intermediate wall to an adjacent passage to exit at the outlet end, a means for sealing the peripheral edge of the outer wall on at least one end of the trap, the sealing means comprising a resilient material positioned on the peripheral edge of said outer trap wall, the resilient material extending axially outwardly at least a predetermined distance beyond the cellular structure end to overlie a peripheral portion of the end of the cellular structure and to block passage of combustion product through certain of the passages, and the housing further including a first clam shell portion, and a complementary second clam shell portion, the second clam shell portion being joined to the first clam shell portion to surround the cellular structure and to hold the resilient material in a position on the cellular structure whereby the flow of combustion product through said certain trap passages is prevented.

2. The processor of claim 1 wherein each of said clam shell portions of the housing is formed so as to radially inwardly cant the axially outwardly extending resilient material to seal said certain passages.

3. The processor of claim 2 wherein the resilient material comprises two ends, one end having a tongue portion, and the other end having a tongue-receiving portion to join the ends of the wrapped resilient material.

4. The processor of claim 3 wherein the resilient material is a heat-expandable mat mount material.

5. An exhaust processor assembly comprising a housing, the housing including an inlet for introducing a combustion product into the housing and an outlet for exhausting combustion product from the housing, a particulate trap in the housing, the trap comprising a cellular structure having opposite ends, an outer wall extending longitudinally between said ends, and a plurality of porous intermediate walls to provide a plurality of substantially parallel passages extending longitudinally therethrough from said inlet to said outlet, the housing including a plurality of seats to embrace the peripheral portion of the end of the cellular structure, means for closing alternate passages at opposite ends of the trap such that combustion product entering a passage at the inlet end must pass through an intermediate wall to an adjacent passage to exist at the outlet end, and a means for sealing the peripheral edge of the outer wall on at least one end of the trap to overlie a peripheral portion of the end of the cellular structure and to block passage of combustion product through certain of the passages, the sealing means including a resilient band positioned on an axially outer portion of the outer wall of the cellular structure, the resilient band including two ends, one end inclusing a tongue portion, and the other end including a tongue-receiving portion joining the ends of the positioned resilient band, and a resilient ring positioned between the housing seats and the resilient band so as to close certain of the passages, whereby the flow of combustion product through said certain passages is prevented.

6. The processor of claim 5 wherein the resilient band and the resilient ring are a heat-expandable mat mount material.

* * * * *